(12) United States Patent
Shin

(10) Patent No.: US 9,223,438 B2
(45) Date of Patent: Dec. 29, 2015

(54) METHOD OF COMPENSATING REFERENCE DATA AND TOUCH SCREEN APPARATUS USING THE METHOD

(71) Applicant: LG Display Co., Ltd., Seoul (KR)

(72) Inventor: Sunkyung Shin, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 21 days.

(21) Appl. No.: 14/096,012

(22) Filed: Dec. 4, 2013

(65) Prior Publication Data

US 2014/0176509 A1 Jun. 26, 2014

(30) Foreign Application Priority Data

Dec. 21, 2012 (KR) ........................ 10-2012-0151149

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 8,395,589 B2* | 3/2013 | Wisniewski | ............ | G06F 3/044 345/173 |
| 2003/0132922 A1* | 7/2003 | Philipp | .................. | G06F 3/044 345/173 |
| 2006/0097991 A1* | 5/2006 | Hotelling | .............. | G06F 3/0416 345/173 |
| 2007/0262969 A1* | 11/2007 | Pak | ........................ | G06F 3/0418 345/173 |
| 2009/0174688 A1* | 7/2009 | Westerman | ......... | G06F 3/04883 345/178 |
| 2010/0060608 A1* | 3/2010 | Yousefpor | ..................... | 345/174 |
| 2010/0097355 A1* | 4/2010 | Jang | ...................... | G06F 3/0416 345/178 |
| 2011/0175823 A1* | 7/2011 | Vieta | ............................. | 345/173 |
| 2011/0298746 A1* | 12/2011 | Hotelling | ...................... | 345/174 |
| 2012/0105355 A1* | 5/2012 | Souchkov | ............. | G06F 3/0416 345/174 |
| 2012/0162603 A1* | 6/2012 | Dejima | ................. | A61B 3/113 351/209 |
| 2013/0076675 A1* | 3/2013 | Shin | ...................... | G06F 3/0416 345/173 |
| 2013/0100071 A1* | 4/2013 | Wright et al. | ................. | 345/174 |
| 2013/0162603 A1* | 6/2013 | Peng et al. | ..................... | 345/178 |
| 2014/0022185 A1* | 1/2014 | Ribeiro et al. | ................ | 345/173 |
| 2014/0104225 A1* | 4/2014 | Davidson | ................ | G06F 3/044 345/174 |
| 2014/0125623 A1* | 5/2014 | Atkinson et al. | .............. | 345/174 |

* cited by examiner

*Primary Examiner* — Dismery Mercedes
(74) *Attorney, Agent, or Firm* — Morgan, Lewis & Bockius LLP

(57) ABSTRACT

Provided is a method of compensating reference data, including calculating touch compensation data in the n-th frame period by compensating touch raw data in the n-th frame period using the reference data in the (n−1)-th frame period that is stored in a memory, detecting touch candidate coordinates by analyzing the touch compensation data in the n-th frame period, generating reference compensation data in the n-th frame period by setting up a labeling block from the touch raw data corresponding to the touch candidate coordinates and by compensating the touch raw data included in the labeling block, not the touch raw data not included, and generating reference data in the n-th frame period by calculating an average value of the reference compensation data in the n-th frame period, and the reference compensation data in the (n−k)-th to (n−1)-th frame periods, stored in the memory.

7 Claims, 9 Drawing Sheets

FIG. 6

|    | C1 | C2 | C3 | C4 |
|----|----|----|----|----|
| R1 |    |    |    |    |
| R2 |    |    |    |    |
| R3 |    |    |    |    |
| R4 |    |    |    |    | ns
METHOD OF COMPENSATING REFERENCE DATA AND TOUCH SCREEN APPARATUS USING THE METHOD

CROSS-REFERENCE TO RELATED APPLICATIONS

This application claims the benefit under 35 U.S.C. §119 (a) of Korean Patent Application No. 10-2012-0151149, filed on Dec. 21, 2012, in the Korean Intellectual Property Office, the entire disclosure of which is incorporated by reference herein for all purposes.

BACKGROUND OF THE INVENTION

1. Technical Field

The disclosure relates to a method of compensating reference data and a touch screen apparatus using the method.

2. Discussion of the Related Art

In the recent years, flat electronic display technologies have been developed that are necessary for many new and emerging digital information products and applications that support the information society. Examples of this are liquid crystal display (LCD), plasma display panel (PDP), organic light emitting diode (OLED) and the like. A flat apparatus for displaying images, using the OLED technology among these, has the following characteristics: a low-voltage operation, a thin profile, wide viewing angles, and fast response times.

A user interface (UI) allows for simultaneous communication between a user and various electrical and electronic apparatus and provides the user with an easy, voluntary control over the apparatus. Typical examples of the user interface are a keypad, a keyboard, a mouse, an on-screen display (OSD), and a remote controller equipped with an infrared communication function or radio frequency (RF) communication function. A user interface technology has made advances toward making the user interface more human friendly and increasing convenience of operating the user interface. In the recent years, the user interface has evolved into a touch UI, a voice recognition UI, a 3D UI and the like.

There is a trend toward the indispensable adoption of the touch UI in a portable information apparatus. The touch UI finds further application in the home appliances as well. As one example of the touch screen apparatus realizing the touch UI, a mutual capacitance type touch screen apparatus that is capable of sensing proximity as well a touch and recognizing multi-touches (or multi-proximity) has gained in popularity.

The mutual capacitance type touch screen apparatus includes Tx lines, Rx lines that the Tx lines intersect, and touch sensors formed on intersection portions at which the Tx lines and the Rx lines intersect. Each of the touch sensors has mutual capacitance. The touch screen apparatus detects amounts of change in voltages of the touch sensors before and after the touch (or the proximity) and thus determines whether or not a conductive material comes into contact with a touch screen and a position of the conductive material relative to the touch screen. The touch screen apparatus supplies a drive pulse to the Tx lines in the touch screen panel, converts amounts of change on charges on the touch sensors into touch row data, which are digital data, analyzes the touch raw data, and thus calculates touch coordinates.

On the other hand, in the related art, there is well known a method of compensating touch raw data, in which the touch raw data is compensated using reference data before analyzing the touch raw data and thus calculating the touch coordinates. In the method of compensating touch raw data in the related art, it is determined when a user's touch does not occur, in which case the reference data is updated. For this reason, in the method of compensation touch raw data in the related art, there occurs a problem in that when noise changes abruptly for a short period of time, the noise is not reflected in the reference data. In this case, in the method of compensation touch raw data in the related art, there occurs a further problem in that since the touch raw data is compensated using the reference data in which the noise is not reflected, the touch raw data is erroneously compensated.

SUMMARY OF THE INVENTION

According to an aspect of the disclosure, there is provided a method of compensating reference data, including calculating touch compensation data in the n-th frame period by compensating touch raw data in the n-th frame period using the reference data in the (n−1)-th frame period that is stored in a memory, detecting touch candidate coordinates by analyzing the touch compensation data in the n-th frame period, generating reference compensation data in the n-th frame period by setting a labeling block on the touch raw data corresponding to the touch candidate coordinates and by compensating the touch raw data included in the labeling block without compensating the touch raw data not included in the labeling block, and generating reference data in the n-th frame period by calculating an average value of the reference compensation data in the n-th frame period, and the reference compensation data in the (n−1)-th to (n−1)-th frame periods, stored in the memory.

According to an aspect of the disclosure, there is provided a touch screen apparatus including a touch screen panel that includes Tx lines, Rx lines, and touch sensors formed on intersection portions where the Tx lines and the Rx lines intersect, a touch drive circuit that supplies a drive pulse to the Tx lines, converts voltages received through the Rx lines into digital data, and thus outputs touch raw data, and a touch algorithm execution unit into which the touch raw data are input from the touch drive circuit, in which the touch algorithm execution unit includes a touch raw data compensation unit that calculates touch compensation data in the n-th frame period by compensating the touch raw data in the n-th frame period using reference data in the (n−1)-th frame period stored in a memory, a touch candidate coordinates detection unit that analyzes the touch compensation data in the n-th frame period and thus detects touch candidate coordinates, a reference compensation data generation unit that generating reference compensation data in the n-th frame period by setting a labeling block on the touch raw data corresponding to the touch candidate coordinates and by compensating the touch raw data included in the labeling block without compensating the touch raw data not included in the labeling block, and a reference data generation unit that generates reference data in the n-th frame period by calculating an average value of the reference compensation data in the n-th frame period, and the reference compensation data in the (n−1)-th to (n−1)-th frame periods, stored in the memory.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIG. 6 is an exemplary view illustrating the labeling block.

DETAILED DESCRIPTION OF THE EMBODIMENTS

Figure 1:
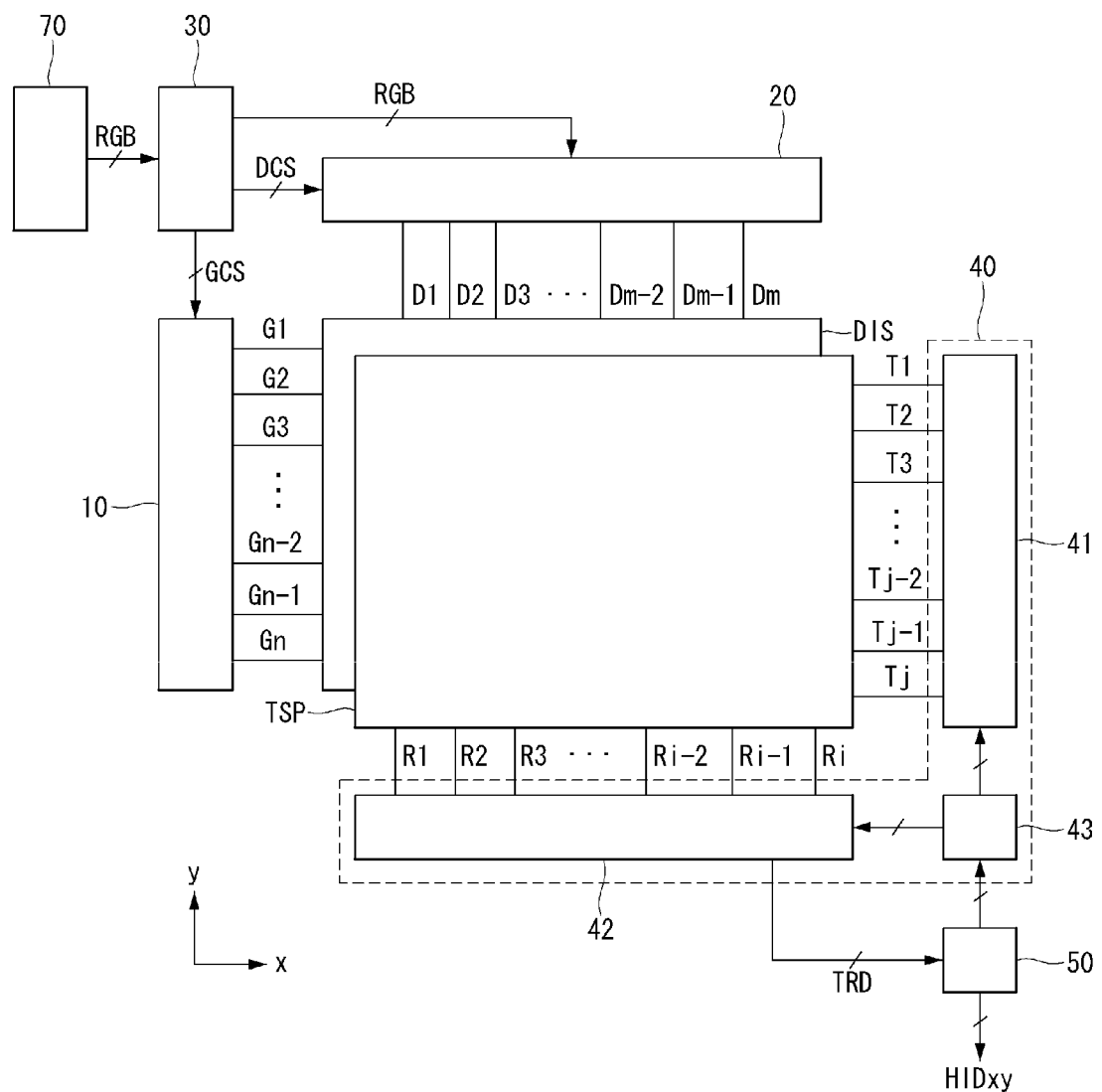
FIG. 1 is a block diagram schematically illustrating a display apparatus and a touch screen apparatus according to an embodiment.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

FIG. 1 is a block diagram schematically illustrating a display apparatus and a touch screen apparatus according to an embodiment. Referring to FIG. 1, the display apparatus includes a display panel (DIS), a gate drive circuit 10, a data drive circuit 20, a timing controller 30, a host system 70 and others. The touch screen apparatus includes a touch panel (TSP), a touch panel drive circuit 40, a touch algorithm execution unit 50 and others.

First, the display apparatus according to the embodiment is described in detail. The display apparatus according to the embodiment is implemented as a liquid crystal display (LCD), a field emission display (FED), a plasma display panel (PDP), an organic light emitting display (OLED), an electrophoresis display (EPD) or others. The display apparatus according to the embodiment is mainly described below that is implemented as the liquid crystal device, but it is noted that this does not impose any limitation to the display apparatus.

The display panel (DIS) includes a lower substrate and an upper substrate with a layer of liquid crystal being formed between them. Multiple data lines D1 to Dm (m is a natural number) and multiple gate lines G1 to Gn (n is a natural number) that intersects the multiple data lines D1 to Dm (m is a natural number) are formed on the lower substrate of the display panel (DIS). In addition, multiple thin transistors are formed at intersection portions at which the multiple data lines D1 to Dm intersect the multiple gate lines G1 to Gn. Moreover, multiple pixel electrodes and storage capacitors are formed on the lower substrate of the display panel (DIS). The multiple pixel electrodes are for applying a data voltage to liquid crystal cells. The storage capacitors are connected to the multiple pixel electrodes to maintain the voltage of the liquid crystal cell.

A black matrix, a color filter, and others are formed on the upper substrate of the display panel (DIS). However, if the display panel (DIS) is realized as having a color-filter-on-TFT (OCT) construction, the black matrix and the color filter may be formed on the lower substrate of the display panel (DIS). The display panel (DIS) is realized in any well-known liquid crystal mode, such as a twisted nematic (TN) mode, a vertical alignment (VA) mode, an in-plane switching (IPS) mode, and a fringe field switching (FFS) mode.

A polarizer is attached to each of the upper substrate and the lower substrate of the display panel (DIS), and an alignment layer is formed in such a manner as to set a pretilt angle of liquid crystal molecules anchored on the inside surface of the alignment layer. A column spacer for maintaining a cell gap between liquid crystal cells is formed between the upper substrate and the lower substrate of the display panel (DIS). A backlight unit is arranged behind the backside of the display panel (DIS). The backlight unit is realized as an edge type or direct type backlight unit and emits light to the display panel (DIS).

The data drive circuit 20 receives digital image data RGB and a source timing control signal (DCS) from the timing controller 30. The data drive circuit 20 converts the digital image data RGB into an analog positive/negative polarity data voltage according to a source timing control signal (DCS) and supplies the result of the conversion to data lines. The gate drive circuit 10 supplies sequentially a gate pulse (or a scan pulse), which is synchronized with a data voltage, to the gate lines G1 to Gn and selects pixels in the display panel (DIS) to which the data voltage is applied.

The digital image data RGB and timing signals are input from the host system 70 into the timing controller 30. The timing signals include a vertical synchronization signal, a horizontal synchronization signal, a data enable signal, a dot clock and others. The vertical synchronization signal is a signal that defines one frame period. The horizontal synchronization signal is a signal that defines one horizontal period necessary to supply the data voltages to the pixels in one horizontal line in the display panel (DIS). The data enable signal is a signal that defines a period during which effective data are input. The dot clock is a signal that repeats with a short cycle time.

In order to control timing of operation of the gate drive circuit 10 and timing of operation of the data drive circuit 20, based on timing signals, the timing controller 30 generates a gate timing signal (GCS) for controlling the timing of the operation of the gate drive circuit 10 and the source timing control signal (DCS) for controlling the timing of the operation of the data drive circuit 20. The timing controller 30 outputs the gate timing control signal (GCS) to the gate drive circuit 10 and outputs the digital image data RGB and the source timing control signal (DCS) to the data drive circuit 20.

The host system 70 is implemented as any one of a navigation system, a set-top box, a DVD player, a Blu-ray disk player, a personal computer (PC), a home theater system, a broadcast receiver, a phone system. The host system 70 includes a system on chip (SoC) with a built-in scaler and converts the digital image data RGB on an image that is input, into a format suitable for displaying it on the display panel (DIS). The host system 70 transmits the digital image data RGB and the timing signals to the timing controller 30. In addition, the host system 70 analyzes touch coordinates data HiDxy that are input from the touch algorithm execution 50 and executes an application program associated with coordinates at which a user's touch occurs.

Second, the touch screen apparatus according to an embodiment is described in detail. A touch screen panel (TSP) includes Tx lines T1 to Tj (j is a natural number equal to or greater than 2), Rx lines R1 to Ri (i is a natural number equal to or greater than 2) that intersect the Tx lines T1 to Tj, and (i×j) touch sensors formed on intersection portions where the Rx lines R1 to Ri intersect the Tx lines T1 to Tj. Each of the touch sensors is realized as having mutual capacitance in terms of equivalent circuit, but it is noted that each of the touch sensors each is not limited to this.

If the touch screen apparatus is combined with the display apparatus, the touch screen panel (TSP) is attached to the upper portion of the display panel (DIS). Specifically, if the display apparatus is realized as the liquid crystal display, the touch screen panel (TSP) is attached to the upper polarizer of the display panel (DIS) or attached between the upper polarizer and the upper substrate of the display panel (DIS). In addition, the touch sensors (an in-cell type) of the touch screen panel TSP are formed on the lower substrate within the display panel of the liquid crystal device, along with a pixel array.

The touch panel drive circuit 40 supplies a drive pulse to the Tx lines T1 to Tj to synchronize them and senses a touch sensor voltage through the Rx lines R1 to Ri. The touch panel drive circuit 40 includes a Tx drive circuit 41, an Rx drive circuit 42, and a touch controller 43. The Tx drive circuit 41, the Rx drive circuit 42, and the touch controller 43 are integrated into one read-out IC (ROIC).

The Tx drive circuit 41 selects a Tx channel that is to output the drive pulse, under control of the touch controller 43 and supplies the drive pulse to the Tx lines connected to the selected Tx channel. The Rx drive circuit 42 selects an Rx channel that is to receive amounts of change in charges on the touch sensors, under control of the touch controller 43 and receives the amounts of change in the charges on the touch sensors through the Rx lines connected to the selected Rx channel. The Rx drive circuit 42 samples the amounts of change in the charges on the touch sensors that are received through the Rx lines R1 to Ri and accumulates the result of the sample in an integrator. The Rx drive circuit 42 inputs the voltage accumulated in the integrator into an analog-to-digital converter (ADC) and converts the voltage that is input, into touch raw data TRD, thereby outputting the result of the conversion.

The touch controller 43 generates a Tx setup signal for setting the Tx channel over which the drive pulse is output by the Tx drive circuit 41 and a Rx setup signal for setting the Rx channel over which the touch sensor voltage is received by the Rx drive circuit 42. In addition, the touch controller 43 generates timing control signals for controlling timing of operation of the Tx drive circuit 41 and timing of operation of the Rx drive circuit 42.

The touch algorithm execution 50 is supplied with the touch raw data TRD from the touch drive circuit 40. The touch algorithm execution 50 compensates the touch raw data TRD and calculates touch compensation data TCD by using reference data RD. The touch algorithm execution 50 sequentially uses an integral compensation algorithm, a labeling algorithm, and the like with respect to the touch compensation data TCD to calculate touch coordinates. The integral compensation algorithm means an algorithm that unifies the touch compensation data TCD with a positive value and the touch compensation data TCD with a negative value into the touch compensation data TCD with the positive value, changing a negative sign to a positive sign. The labeling algorithm means an algorithm that compares a touch threshold value with the touch compensation data TCD and thus detects the coordinates of the touch compensation data TCD that are equal to or more than the touch threshold value, as touch candidate coordinates TCC. The touch algorithm execution 50 transmits the touch coordinates data HiDxy including information on the touch coordinates to the host system 70. The touch algorithm execution 50 is realized as a microcontroller unit (MCU). The touch algorithm execution 50 is described in detail below referring to FIGS. 2 and 3.

Figure 2:
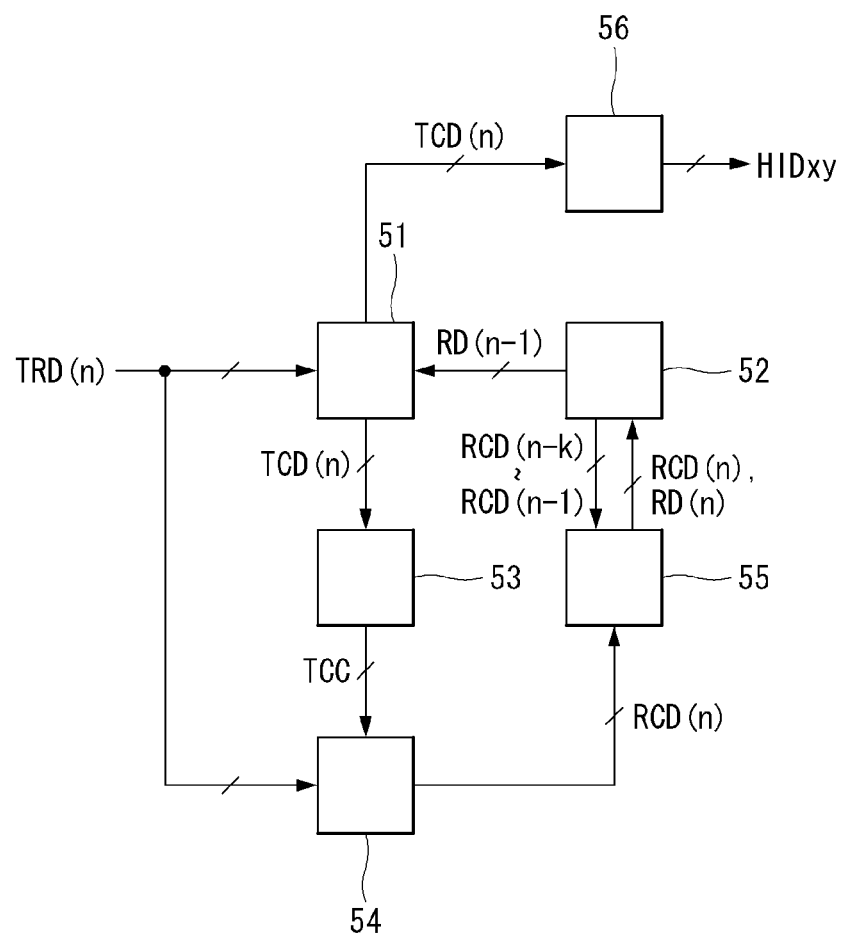
FIG. 2 is a block diagram illustrating in detail a touch algorithm execution unit according to the embodiment.
Figure 3:
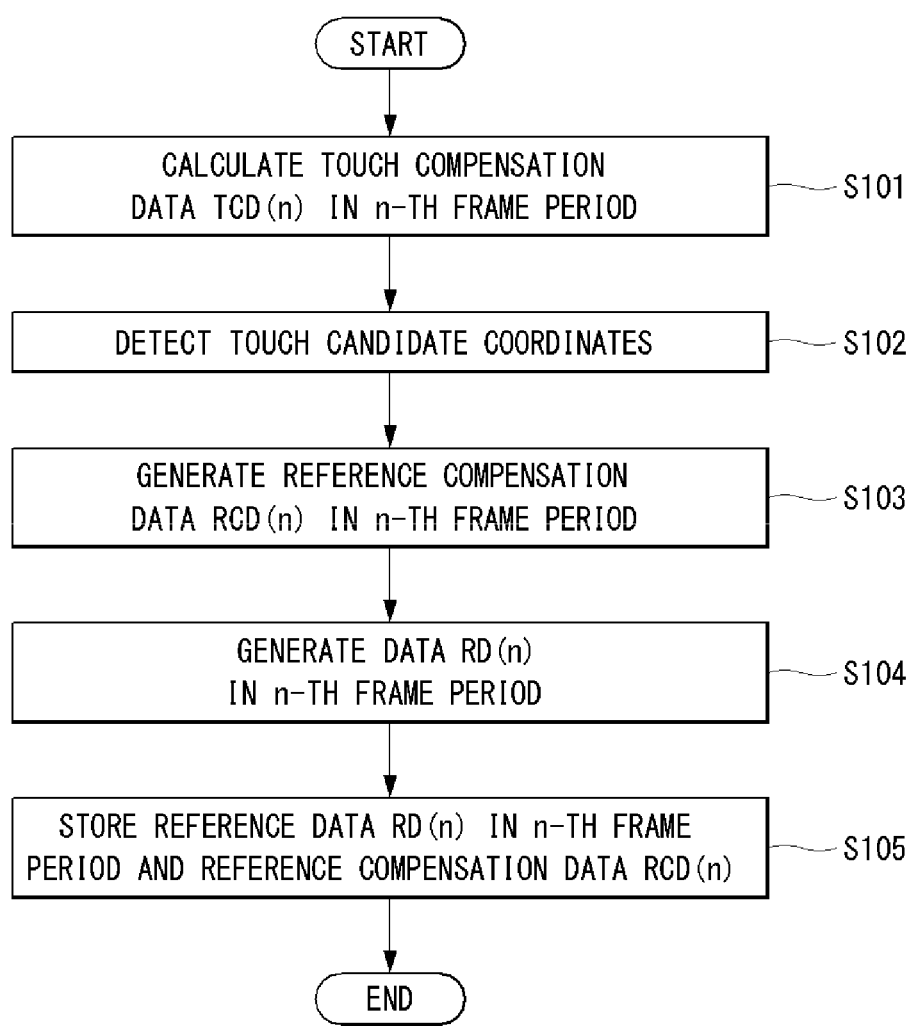
FIG. 3 is a flowchart illustrating a method of compensating reference data according to the embodiment.
Figure 4:
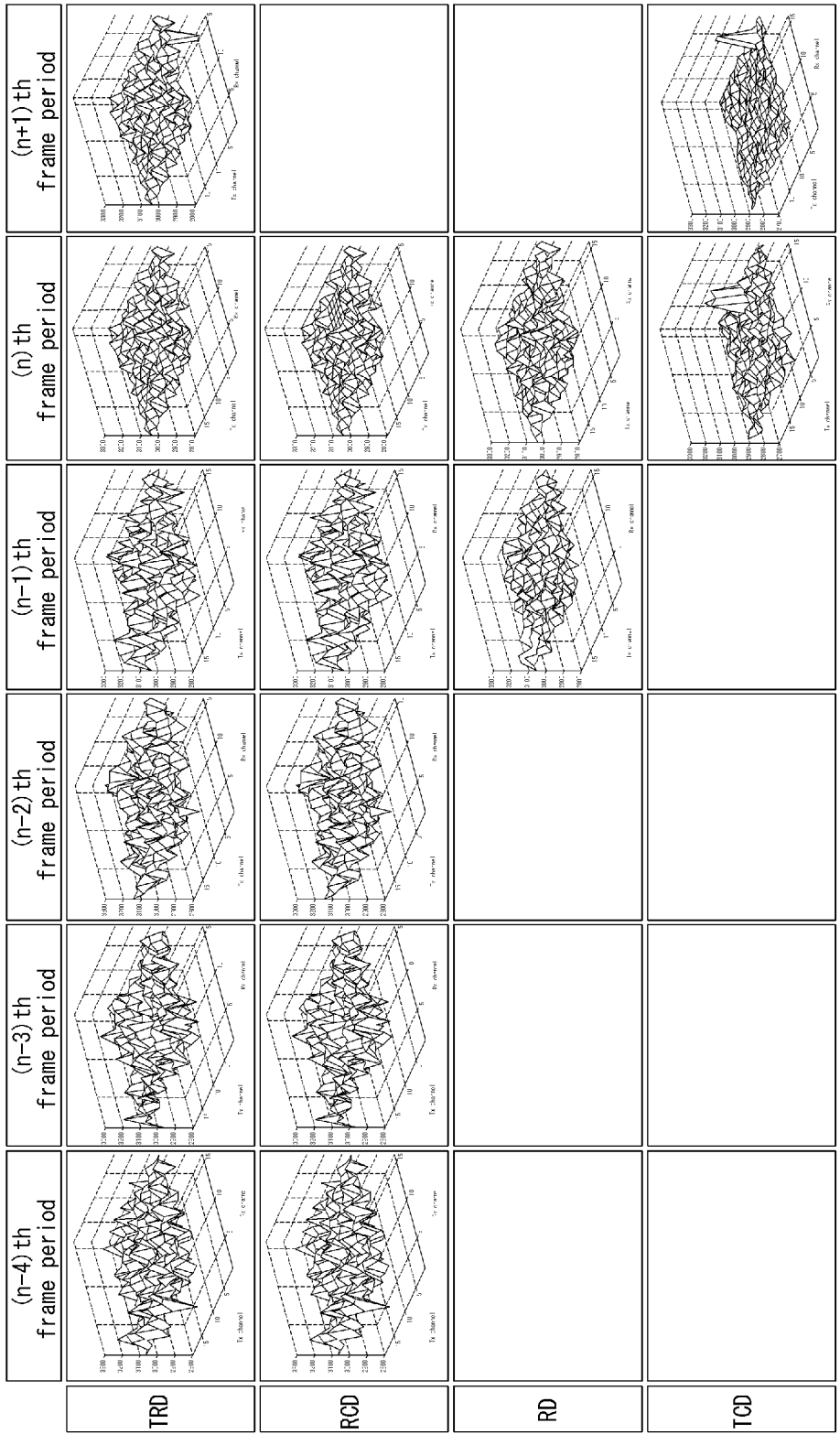
FIG. 4 is an exemplary view illustrating touch raw data, reference compensation data, reference data, and touch compensation data according to the method of compensating the reference data, illustrated in FIG. 3.

FIG. 2 is a block diagram illustrating in detail the touch algorithm execution unit according to the embodiment. FIG. 3 is a flowchart illustrating a method of compensating the reference data according to the embodiment. FIG. 4 is an exemplary view illustrating the touch raw data, the reference compensation data, the reference data, and the touch compensation data according to the method of compensating the reference data, illustrated in FIG. 3. In graphs in FIG. 4, each of which plots the touch raw data, the reference compensation data, the reference data and the touch compensation data, an X axis indicates a position of the RX line (the Rx channel), a Y axis indicates a position of the Tx line (the Tx channel), and a Z axis indicates a data value of the corresponding position. Accordingly, the position of the Rx line (the Rx channel) and position of the Tx line (the Tx channel) are expressed in coordinates (x, y).

Referring to FIG. 2, the touch algorithm execution unit 50 includes a touch raw data compensation unit 51, a memory 52, a touch candidate coordinates detection unit 53, a reference compensation data generation unit 54 and a reference data generation unit 55. The touch algorithm execution unit 50 may further include a touch coordinates calculation unit 56 that sequentially uses the integral compensation algorithm, the labeling algorithm, and the like with respect to the touch compensation data TCD to calculate the touch coordinates. The touch coordinates calculation unit 56 transmits the touch coordinates data HiDxy including the information on the touch coordinates to the host system 70. The reference compensation data generation unit 54 and the touch coordinates calculation unit 56 are separately described above in terms of functions for the sake of description convenience, but the reference compensation data generation unit 54 may be included in the touch coordinates calculation unit 56. A method of compensation a reference data, used by the touch algorithm execution 50, is described in detail below referring to FIGS. 2, 3, and 4.

Firstly, touch raw data TRD(n) in the n-th frame period are input from the Rx drive circuit 42 into the touch raw data compensation unit 51, and reference data RD(n−1) in the (n−1)-th frame period, stored in the memory 52, are input into the touch raw data compensation unit 51. The touch raw data compensation unit 51 compensates the touch raw data TRD(n) in the n-th frame period and calculates touch compensation data TCD(n) in the n-th frame period, by using the reference data RD(n−1) in the (n−1)-th frame period. Specifically, the touch raw data compensation unit 51, as illustrated in FIG. 4, performs an arithmetic operation of subtracting the reference data RD(n−1) in the (n−1)-th frame period from the touch raw data TRD(n) in the n-th frame period and calculates the touch compensation data TCD(n) in the n-th frame period. The reference data RD(n−1) in the (n−1)-th frame period, as illustrated in FIG. 4, are calculated as an average value of reference compensation data RCD(n−4) to RCD (n−1) in the (n−4)-th to (n−1)-th frame periods. The touch raw data compensation unit 51 outputs the touch compensation data TCD(n) in the n-th frame period to the touch candidate coordinates detection unit 53 and the touch coordinates calculation unit 56 (S101).

Secondly, the touch compensation data TCD(n) in the n-th frame period are input from the touch raw data compensation unit 51 into the touch candidate coordinates detection unit 53. The touch candidate coordinates detection unit 53 analyzes the touch compensation data TCD(n) in the n-th frame period and thus detects the touch candidate coordinates TCC. Specifically, the touch candidate coordinates detection unit 53 sequentially uses the integral compensation algorithm, the labeling algorithm, and the like with respect to the touch compensation data TCD in the n-th frame period. The integral compensation algorithm means the algorithm that unifies the touch compensation data TCD with a positive value and the touch compensation data TCD with a negative value into the touch compensation data TCD with the positive value, changing a negative sign to a positive sign. The labeling algorithm means an algorithm that compares a touch threshold value with the touch compensation data TCD and thus detects the coordinates of the touch compensation data TCD that are equal to or more than the touch threshold value, as touch candidate coordinates TCC.

Figure 5A:
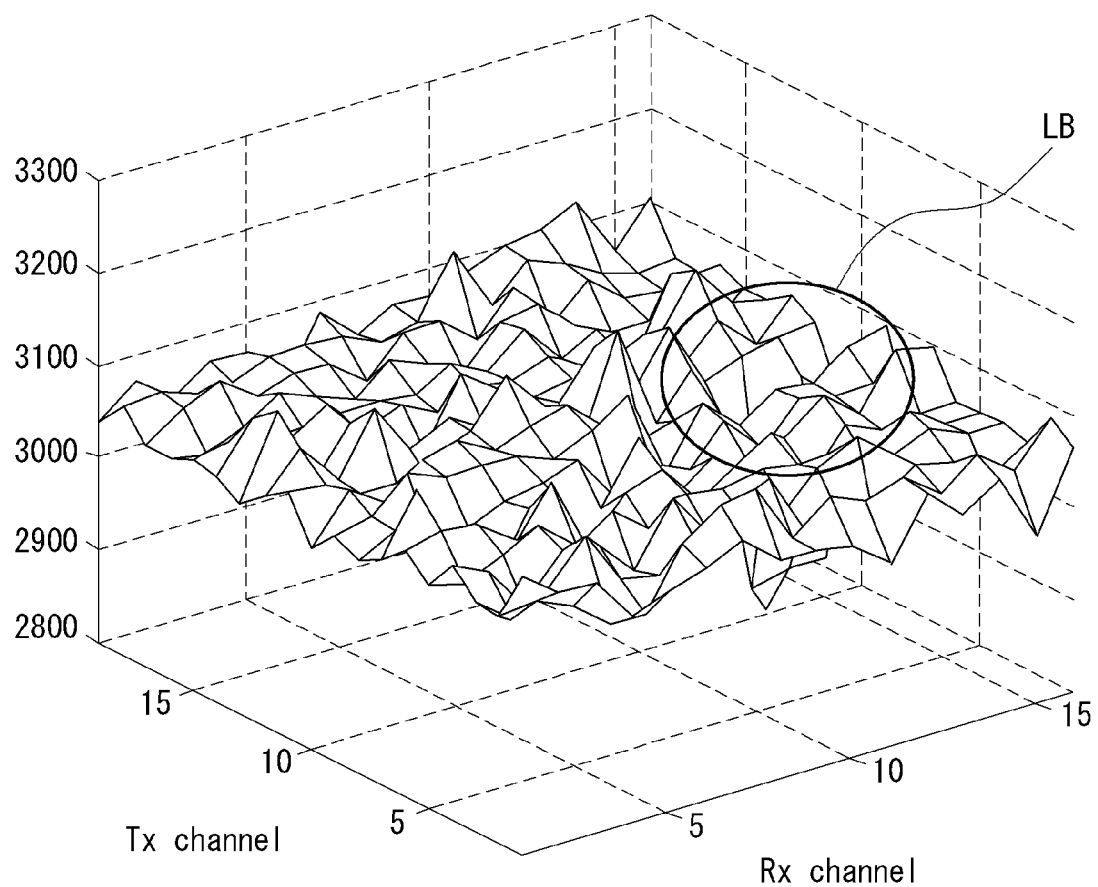
FIGS. 5A and 5B are exemplary views illustrating the touch raw data and reference compensation data, respectively.
Figure 5B:
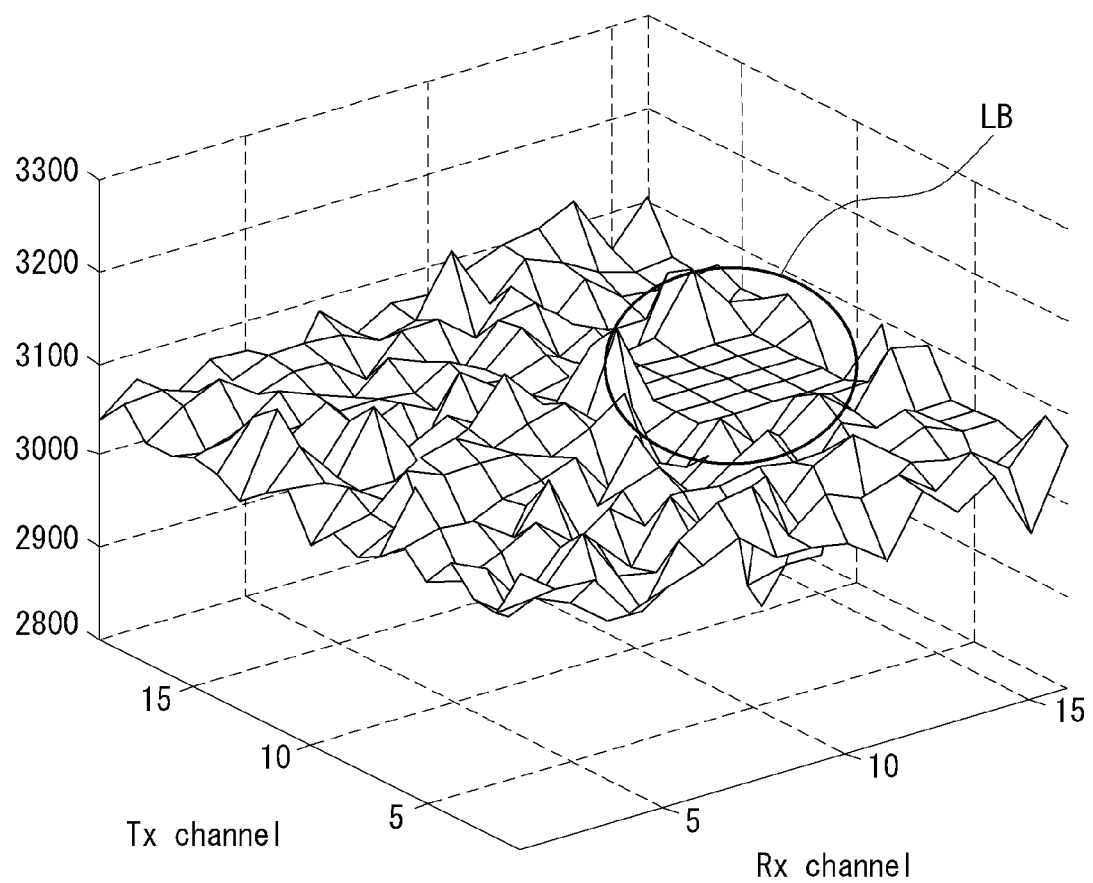

Thirdly, the touch raw data TRD(n) in the n-th frame period are input from the Rx drive circuit 42 into the reference compensation data generation unit 54. As illustrated in FIG. 5A, the reference compensation data generation unit 54 sets a labeling block on the touch raw data TRD corresponding to the touch candidate coordinates TCC. As illustrated in FIG. 5B, the reference compensation data generation unit 54 does not compensate the touch raw data not included in the labeling block LB and instead compensates the touch raw data included in the labeling block LB, thereby generates the reference compensation data RCD in the n-th frame period. Therefore, as illustrated in FIGS. 5A and 5B, the touch raw data TRD and the reference compensation data RCD have the same value at the coordinates at the touch raw data TRD that are not included in the labeling block LB, but the touch raw data TRD and the reference compensation data RCD have different values at the coordinates at which the touch raw data TRD are included in the labeling block LB. In graphs in FIGS. 5A and 5B, each of which plots the touch raw data and the reference compensation data, an X axis indicates a position of the RX line (the Rx channel), a Y axis indicates a position of the Tx line (the Tx channel), and a Z axis indicates a data value of the corresponding position. Accordingly, the position of the Rx line (the Rx channel) and position of the Tx line (the Tx channel) are expressed in coordinates (x, y).

In addition, if the user's touch does not occur, the touch candidate coordinates are not detected. Therefore, the reference compensation data RCD(n−4) to RCD(n−1) in the (n−4)-th to (n−1)-th frame periods during which the user's touch does not occur are generated in substantially the same manner as the touch raw data TRD(n−4) to TRD (n−1) in the (n−4)-th to (n−1)th frame periods, as illustrated in FIG. 4. However, the reference compensation data RCD(n) in the n-th frame period during which the user's touch occurs are generated in such a manner that the reference compensation data RCD(n) have a different value from a value that the touch raw data TRD(n) in the n-th frame period have, in the labeling block LB, as illustrated in FIG. 4. A method is described in detail below by which the reference compensation data generation unit 54 compensates the touch raw data included in the labeling block LB.

Figure 6:
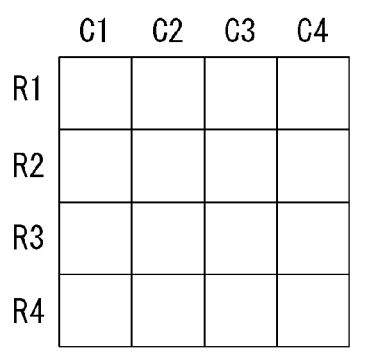

The reference compensation data generation unit 54 compensates the touch raw data included in the labeling block LB in such a manner that each of the touch raw data has a maximum value, a minimum value of the touch raw data, or an average value of the maximum value and the minimum value. FIG. 6 is an exemplary view illustrating the labeling block.

FIG. 6 illustrates the labeling block that is a 4×4 block, for the sake of description convenience. For example, the reference compensation data generation unit 54, as illustrated in FIG. 6, compensates the sixteen (16) touch raw data included in the labeling block LB in such a manner that each of the sixteen (16) touch raw data has a maximum value or a minimum value of the touch raw data or an average value of the maximum value and the minimum value.

In addition, the reference compensation data generation unit 54 compensates the touch raw data included in the labeling block LB in such a manner that each of the touch raw data has an average value of the touch raw data. For example, the reference compensation data generation unit 54, as illustrated in FIG. 6, can compensate the sixteen (16) touch raw data included in the labeling block LB in such a manner that each of the sixteen (16) touch raw data has an average value of the sixteen (16) touch raw data.

In addition, the reference compensation data generation unit 54 compensates the touch raw data included in the labeling block LB in such a manner that each of the touch raw has a median value of the touch raw data at the coordinates corresponding to an edge of the labeling block LB. For example, the reference compensation data generation unit 54, as illustrated in FIG. 6, can compensate the sixteen (16) touch raw data included in the labeling block in such a manner that each of the sixteen (16) touch raw data has the median value of the twelve (12) touch raw data corresponding to the edge of the labeling block LB.

In addition, the reference compensation data generation unit 54 interpolates the touch raw data in the p-th (p is a natural number that satisfies a condition where 1≤p≤r and r is the number of rows in the labeling block BL) row in the labeling block LB and generates the p-th interpolation data, thereby compensating the touch raw data in the p-th row in the labeling block BL in such a manner that each of the touch raw data has the p-th interpolation data. For example, the reference compensation data generation unit 54, as illustrated in FIG. 6, generates an average value of the touch raw data in the first row R1 in the labeling block LB as the first interpolation data and generates an average value of the touch raw data in the second row R2 as the second interpolation data. Then, the reference compensation data generation unit 54, as illustrated in FIG. 6, compensates the touch raw data in the first row R1 in the labeling block LB in such a manner that each of the touch raw data has the first interpolation data and compensates the touch data in the second row R2 in such a manner that each of the touch raw data has the second interpolation data.

In addition, the reference compensation data generation unit 54 interpolates the touch raw data in the p-th column in the labeling block LB and generates the p-th interpolation data, thereby compensating the touch raw data in the p-th column in the labeling block BL in such a manner that each of the touch raw data has the p-th interpolation data. For example, the reference compensation data generation unit 54, as illustrated in FIG. 6, generates an average value of the touch raw data in the first column C1 in the labeling block LB as the first interpolation data and generates an average value of the touch raw data in the second columns C2 as the second interpolation data. Then, the reference compensation data generation unit 54, as illustrated in FIG. 6, compensates the touch raw data in the first column C1 in the labeling block LB in such a manner that each of the touch raw data has the first interpolation data and compensates the touch data in the second column C2 in such a manner that each of the touch raw data has the second interpolation data.

Furthermore, the reference compensation data generation unit 54 interpolates the touch raw data at coordinates (p, 1) to coordinates (p, p) in the labeling block LB and the touch raw data at coordinates (1, p) to coordinates (p, p) and generates interpolation data. Then, the reference compensation data generation unit 54 compensates the touch raw data at the coordinates (p, 1) to the coordinates (p, p) in the labeling block LB and the touch raw data at the coordinates (1, p) to the coordinates (p, p) in such a manner that each of the touch raw data has the interpolation data. For example, the reference compensation data generation unit 54 generates an average value of the touch raw data at coordinates (2, 1), (2, 2), and (1, 2) in the labeling block LB as the interpolation data and compensates the touch raw data at the coordinates (2, 1), (2, 2), and (1, 2) in the labeling block LB in such a manner that each of the touch raw data has the interpolation data. The touch raw data at the coordinates (2,1) means the touch data that are positioned at the second row R2 and the first column C1 in the labeling block LB (S103).

Fourthly, the reference compensation data RCD(n) in the n-th (n is a natural number) frame period are input from the reference compensation data generation unit 54 into the reference data generation unit 55, and reference compensation data RCD(n−k) to RCD (n−1) in the (n−k)-th (k is a natural number that satisfies a condition wherein n>k) to (n−1)-th frame periods are input from the memory 52 into the reference data generation unit 55. The reference data generation unit 55 calculates an average value of the reference compensation data RCD(n) in the n-th frame period and the reference compensation data RCD (n−k) to RCD(n−1) in the (n−k)-th to (n−1)-th frame periods and thus generates the reference data RD(n) in the n-th frame period. For example, the reference data RD(n) in the n-th frame period, as illustrated in FIG. 4, are calculated as an average value of reference compensation data RCD(n−3) to RCD (n) in the (n−3)-th to n-th frame periods (S104).

Fifthly, the reference data generation unit 55 stores the reference data RD(n) in the n-th frame period and the reference compensation data RCD(n) in the n-th frame period in the memory 52. As a result, when compensating the touch raw data TRD(n+1) in the (n+1) frame period, as illustrated in FIG. 4, in order to calculate the touch compensation data TCD(n+1) in the (n+1)-th frame period, the touch raw data compensation unit 51, can use the reference data RD(n) in the n-the frame period. That is, according to the embodiments, even though the user's touch occurs, the reference data RD(n) can be updated (S105).

As described above, according to the embodiments, the reference data are updated regardless of whether the user's touch occurs. As a result, according to the embodiments even though noise changes abruptly for a short period of time, the noise can be reflected in the reference data. This makes it possible to correctly the touch raw data when compensating the touch raw data by using the reference data.

Figure 7A:
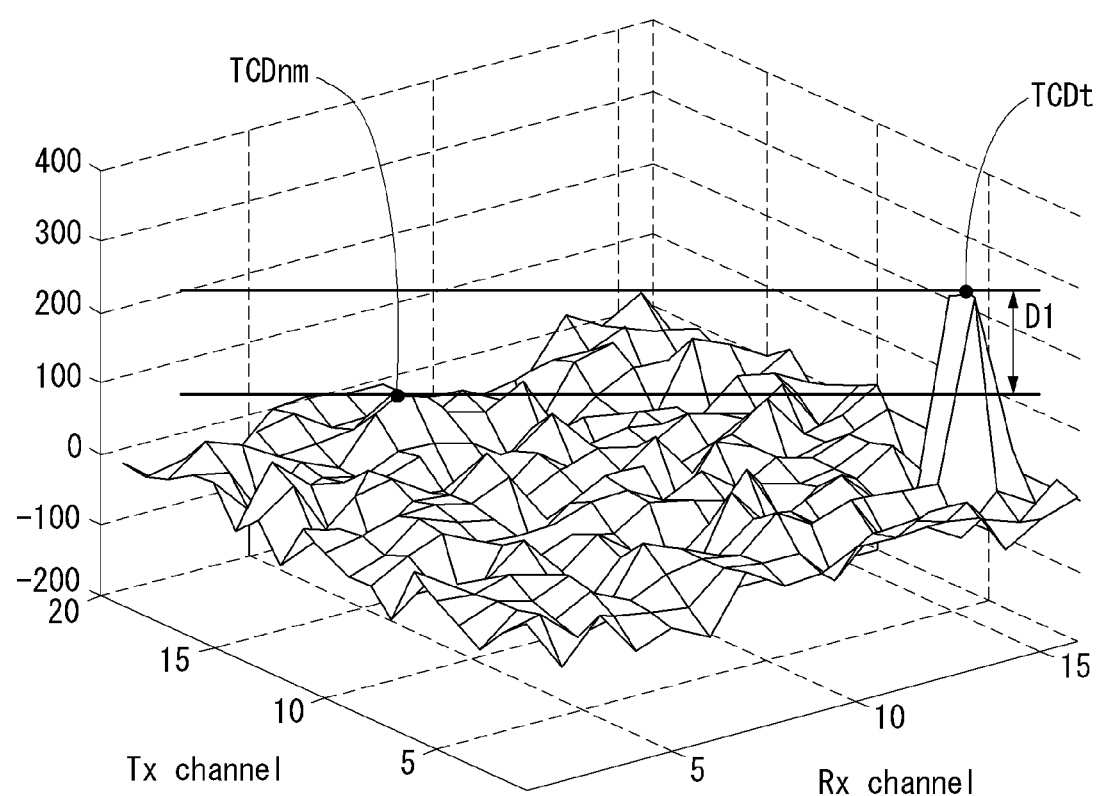
FIGS. 7A and 7B are exemplary views illustrating the touch compensation data calculated using a method of compensating the touch raw data in the related art and the touch compensation data calculated using a method of compensating the touch raw data according to the embodiment, respectively.
Figure 7B:
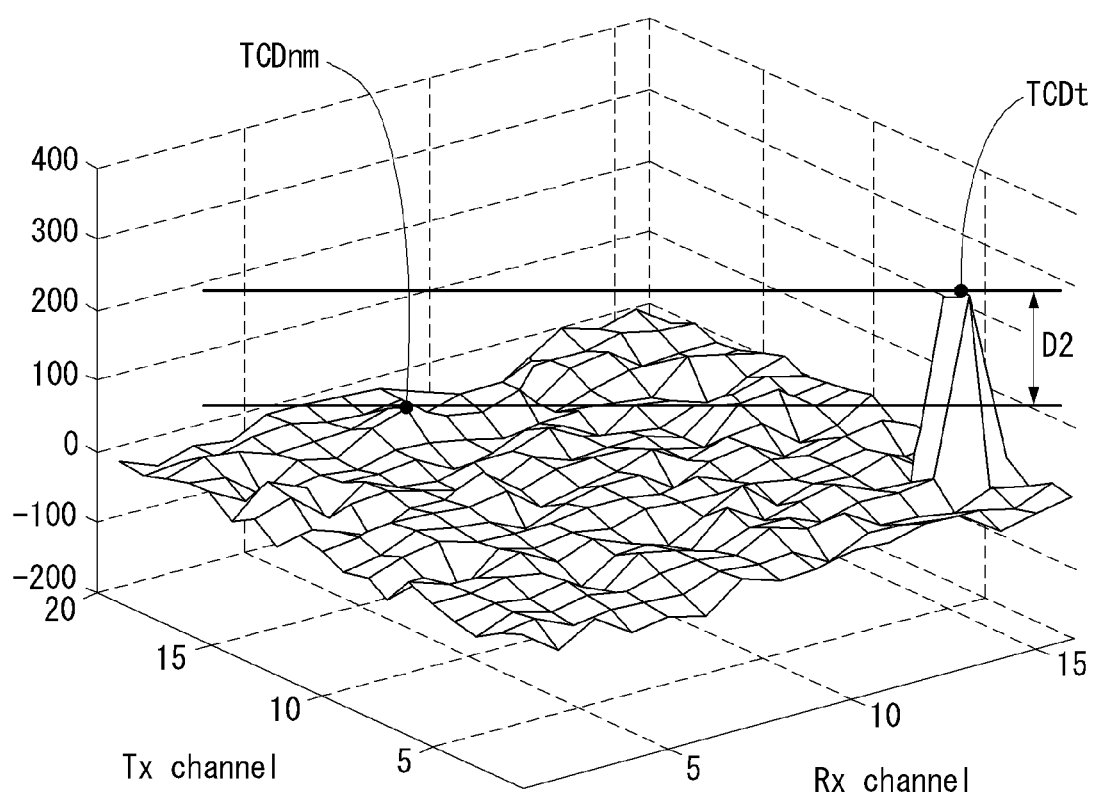

FIGS. 7A and 7B are exemplary views illustrating the touch compensation data calculated using a method of compensating the touch raw data in the related art and the touch compensation data calculated using the method of compensating the touch raw data according to the embodiment, respectively. In graphs in FIGS. 7A and 7B, each of which plots the touch raw data, an X axis indicates a position of the RX line (the Rx channel), a Y axis indicates a position of the Tx line (the Tx channel), and a Z axis indicates a data value of the corresponding position.

It is apparent from FIGS. 7A and 7B that a difference D2 between touch compensation data TCDt at touch coordinates and a maximum value TCDnm of touch compensation data at non-touch coordinates among the touch compensation data in the n-th frame period calculated by the method of compensating the touch raw data according to the embodiment is greater than a difference D1 between the touch compensation data TCDt at the touch coordinates and the maximum value TCDnm of the touch compensation data at the non-touch coordinates among the touch compensation data in the n-th frame period calculated by the method of compensating the touch raw data in the related art. The fact that the difference is small between the touch compensation data TCDt at the touch coordinates and the maximum value TCDnm of the touch compensation data at the non-touch coordinates means that the noise in the touch raw data at the non-touch coordinates is not removed that much. If the noise accumulates up to the touch threshold value, this leads to an error in the calculation of the touch coordinates. In summary, the method of compensating the touch raw data according to the embodiment removes the noise in the touch raw data more effectively than the method of compensating the touch raw data in the related art.

Although the embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen apparatus comprising:
   a touch screen panel that includes Tx lines, Rx lines, and touch sensors formed on intersection portions where the Tx lines and the Rx lines intersect;
   a touch drive circuit that supplies a drive pulse to the Tx lines, converts voltages received through the Rx lines into digital data, and thus outputs touch raw data; and
   a touch algorithm execution unit into which the touch raw data are input from the touch drive circuit,
   wherein the touch algorithm execution unit includes:
   a touch raw data compensation unit that calculates touch compensation data in an n-th (n is a natural number) frame period by compensating the touch raw data in the n-th frame period using reference data in an (n−1)-th frame period stored in a memory,
   a touch candidate coordinates detection unit that analyzes the touch compensation data in the n-th frame period and thus detects touch candidate coordinates,
   a reference compensation data generation unit that generating reference compensation data in the n-th frame period by setting a labeling block on the touch raw data corresponding to the touch candidate coordinates and by compensating the touch raw data included in the labeling block without compensating the touch raw data not included in the labeling block,
   a reference data generation unit that generates reference data in the n-th frame period by calculating an average value of the reference compensation data in the n-th frame period, and a reference compensation data in (n−k)-th to (n−1)-th frame periods, where k is a natural number less than n, stored in the memory, and
   wherein the reference compensation data generation unit compensates the touch raw data included in the labeling block in such a manner that each of the touch raw data has a median value of the touch raw data at the coordinates corresponding to an edge of the labeling block.

2. The apparatus according to claim 1, wherein the reference data generation unit stores the reference compensation data in the n-th frame period and the reference data in the n-th frame period in the memory.

3. The apparatus according to claim 1, wherein the touch raw data compensation unit calculates the touch compensation data in the n-th frame period by subtracting the reference data in the (n−1)-th frame period from the touch raw data in the n-th frame period.

4. The apparatus according to claim 1, wherein the touch candidate coordinates detection unit detects coordinates of the touch compensation data in the n-th frame period that are equal to or more than a touch threshold value, as the touch candidate coordinates.

5. A touch screen apparatus comprising:
a touch screen panel that includes Tx lines, Rx lines, and touch sensors formed on intersection portions where the Tx lines and the Rx lines intersect;
a touch drive circuit that supplies a drive pulse to the Tx lines, converts voltages received through the Rx lines into digital data, and thus outputs touch raw data; and
a touch algorithm execution unit into which the touch raw data are input from the touch drive circuit,
wherein the touch algorithm execution unit includes:
a touch raw data compensation unit that calculates touch compensation data in an n-th (n is a natural number) frame period by compensating the touch raw data in the n-th frame period using reference data in an (n−1)-th frame period stored in a memory,
a touch candidate coordinates detection unit that analyzes the touch compensation data in the n-th frame period and thus detects touch candidate coordinates,
a reference compensation data generation unit that generates reference compensation data in the n-th frame period by setting a labeling block on the touch raw data corresponding to the touch candidate coordinates and by compensating the touch raw data included in the labeling block without compensating the touch raw data not included in the labeling block,
a reference data generation unit that generates reference data in the n-th frame period by calculating an average value of the reference compensation data in the n-th frame period, and a reference compensation data in (n−k)-th to (n−1)-th frame periods, where k is a natural number less than n, stored in the memory, and
wherein the reference compensation data generation unit interpolates the touch raw data in a p-th (p being a natural number that is equal to or greater than one and is equal to or smaller than a number of rows in the labeling block) row in the labeling block, generates a p-th interpolation data, and then compensates the touch raw data in the p-th row in the labeling block in such a manner that each of the touch raw data has the p-th interpolation data.

6. A touch screen apparatus comprising:
a touch screen panel that includes Tx lines, Rx lines, and touch sensors formed on intersection portions where the Tx lines and the Rx lines intersect;
a touch drive circuit that supplies a drive pulse to the Tx lines, converts voltages received through the Rx lines into digital data, and thus outputs touch raw data; and
a touch algorithm execution unit into which the touch raw data are input from the touch drive circuit,
wherein the touch algorithm execution unit includes:
a touch raw data compensation unit that calculates touch compensation data in an n-th (n is a natural number) frame period by compensating the touch raw data in the n-th frame period using reference data in an (n−1)-th frame period stored in a memory,
a touch candidate coordinates detection unit that analyzes the touch compensation data in the n-th frame period and thus detects touch candidate coordinates,
a reference compensation data generation unit that generating reference compensation data in the n-th frame period by setting a labeling block on the touch raw data corresponding to the touch candidate coordinates and by compensating the touch raw data included in the labeling block without compensating the touch raw data not included in the labeling block,
a reference data generation unit that generates reference data in the n-th frame period by calculating an average value of the reference compensation data in the n-th frame period, and a reference compensation data in (n−k)-th to (n−1)-th frame periods, where k is a natural number less than n, stored in the memory, and
wherein the reference compensation data generation unit interpolates the touch raw data in the p-th (p being a natural number that is equal to or greater than one and is equal to or smaller than a number of column in the labeling block) column in the labeling block, generates the p-th interpolation data, and then compensates the touch raw data in the p-th column in the labeling block in such a manner that each of the touch raw data has the p-th interpolation data.

7. A touch screen apparatus comprising:
a touch screen panel that includes Tx lines, Rx lines, and touch sensors formed on intersection portions where the Tx lines and the Rx lines intersect;
a touch drive circuit that supplies a drive pulse to the Tx lines, converts voltages received through the Rx lines into digital data, and thus outputs touch raw data; and
a touch algorithm execution unit into which the touch raw data are input from the touch drive circuit,
wherein the touch algorithm execution unit includes:
a touch raw data compensation unit that calculates touch compensation data in an n-th (n is a natural number) frame period by compensating the touch raw data in the n-th frame period
using reference data in an (n−1)-th frame period stored in a memory,
a touch candidate coordinates detection unit that analyzes the touch compensation data in the n-th frame period and thus detects touch candidate coordinates,
a reference compensation data generation unit that generating reference compensation data in the n-th frame period by setting a labeling block on the touch raw data corresponding to the touch candidate coordinates and by compensating the touch raw data included in the labeling block without compensating the touch raw data not included in the labeling block,
a reference data generation unit that generates reference data in the n-th frame period by calculating an average value of the reference compensation data in the n-th frame period, and a reference compensation data in (n−k)-th to (n−1)-th frame periods, where k is a natural number less than n, stored in the memory, and
wherein the reference compensation data generation unit interpolates the touch raw data at coordinates (p, 1) to coordinates (p, p) in the labeling block and the touch raw data at coordinates (1, p) to coordinates (p, p), generates interpolation data, and then compensates the touch raw data at the coordinates (p, 1) to the coordinates (p, p) in the labeling block and the touch raw data at the coordinates (1, p) to the coordinates (p, p) in such a manner that each of the touch raw data has the interpolation data, with p being a natural number that is equal to or greater than one and is equal to or smaller than a number of rows in the labeling block.

* * * * *